Nov. 8, 1966

J. A. POTTER 3,283,605

SERVOMOTOR DRIVEN BALANCING SYSTEM WITH
BACKLASH BETWEEN COMPONENTS

Original Filed Feb. 24, 1964

2 Sheets-Sheet 1

INVENTOR
James A. Potter

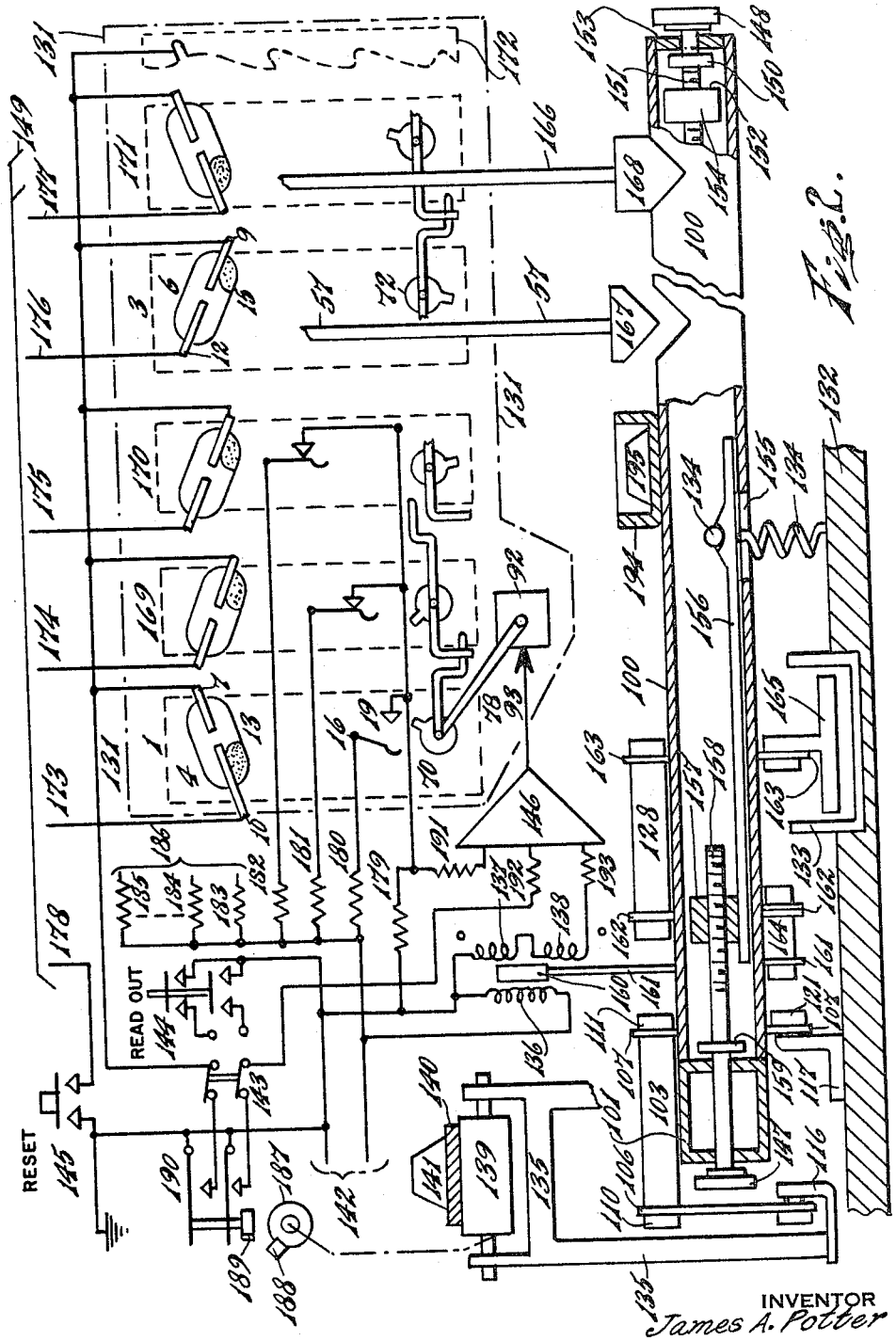

United States Patent Office 3,283,605
Patented Nov. 8, 1966

3,283,605
SERVOMOTOR DRIVEN BALANCING SYSTEM
WITH BACKLASH BETWEEN COMPONENTS
James A. Potter, 12 Green House Blvd.,
West Hartford, Conn.
Original application Feb. 24, 1964, Ser. No. 346,630, now
Patent No. 3,224,518, dated Dec. 21, 1965. Divided
and this application May 3, 1965, Ser. No. 465,223
2 Claims. (Cl. 74—469)

This application is a compulsory division of Serial No. 346,630 filed Feb. 24, 1964, now U.S. Pat. 3,224,518, which was a continuation-in-part of Ser. Nos. 55,847 and 223,427, and all the disclosures of each of said applications is deemed reiterated in clarifying the subject matter. Said Ser. No. 55,847, filed Sept. 14, 1960, was replaced by continuation Ser. No. 455,464, filed May 13, 1965, and issued as U.S. Pat. 3,211,991. Said Ser. No. 223,427, filed Sept. 13, 1962, was replaced by streamlined continuation Ser. No. 538,867, filed March 30, 1966.

This invention employs my least-next principle, whereby there is no predetermined definite internal cycling sequence; rather, changes are made only in the lowest-valued rebalancing elements sufficient to progress toward the measured value.

The accompanying drawings disclose an illustrative embodiment clarifying the principles of my invention.

Figure 1:
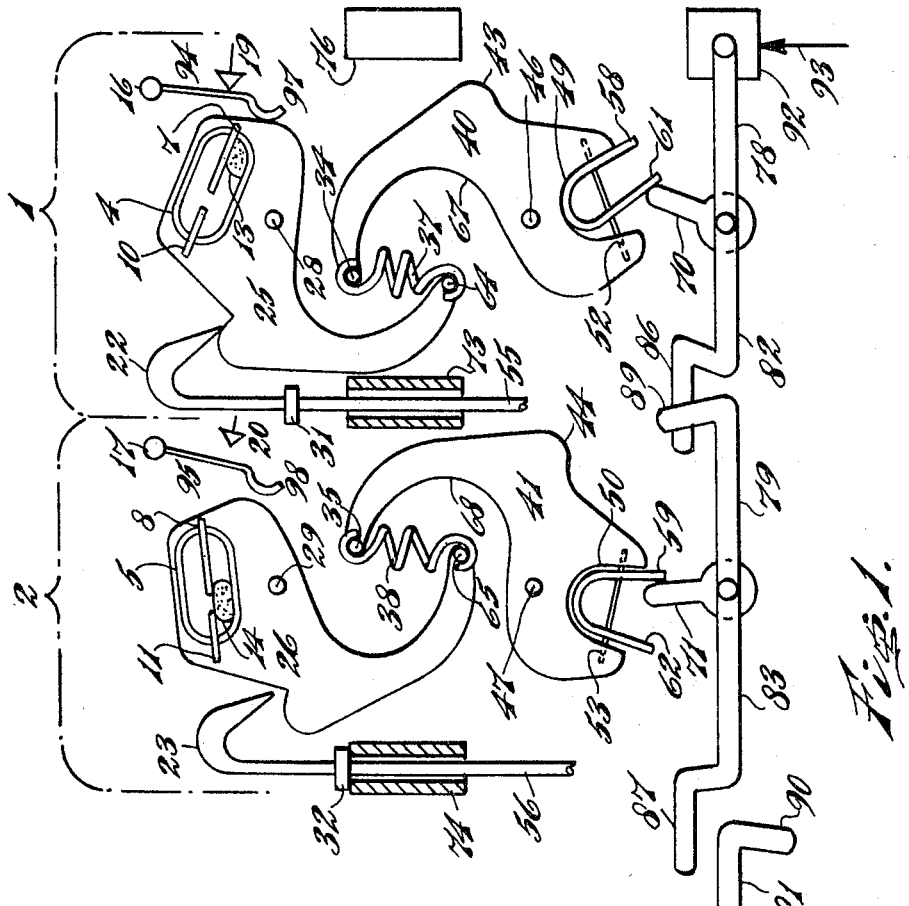
Figure 1:
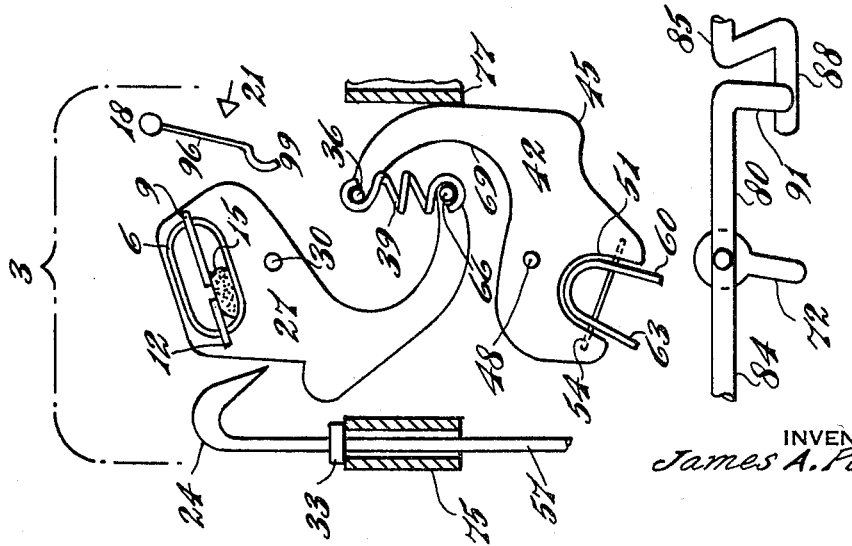

FIGURE 1 is a schematic representation of my motor-driven switch-actuator. In FIGURE 1, each of the sequentially driven mechanisms is of a bi-stable kind, and each mechanism initiates an appropriate readout signal each time it changes its state of equilbrium to provide a rebalance signal.

FIGURE 2 schematically represents one embodiment of a weighing scale system constructed in accordance with the principles of my invention.

In FIGURE 1, rotors 70, 71, and 72 are shown as capable of rotating in either a clockwise or a counterclockwise direction. The motor 92 can rotate in either a clockwise or counterclockwise direction or be motionless, depending upon the nature of the signal 93. It is important that it be recognized that FIGURE 1 schematically shows that when the signal 93 is making a correction, the signal 93 actuates the motor 92 to rotate at least one of a series of rotors such as rotors 70, 71, and 72 in either a clockwise or a counterclockwise direction. The shafts which drive rotors 70, 71, and 72 necessarily rotate in the corresponding clockwise direction, or counterclockwise directions, but in illustrating the backlash driving of the series of shafts in FIGURE 1, it is convenient to think of bevel gearing (not shown) between each of the rotors 70, 71, and 72 and motor 92 and the corresponding shafts. Thus, as signal 93 drives motor 92 clockwise to drive shaft 78 clockwise to drive 70 clockwise to drive shaft 82 clockwise to drive crank 86 clockwise to overcome the backlash to engage offset 89 to drive shaft 79 clockwise to drive rotor 71 clockwise to drive shaft 83 and crank 87 clockwise, the series operation can be understood, nothwithstanding the difficulty in illustrating all of the clockwise rotation while still clarifying the series operation and predetermined backlash of the corresponding series drive of rotor 71 in a counterclockwise direction by motor 92 when appropriately directed by signal 93.

Rotor 70 rotates in the same direction as its drive shaft 78, 82. Crank extension 86 has an axis parallel to the axis of rotation of shaft 82, and its axis of rotation is the same as that of shaft 82 because it is attached as a crank to it. Crank extension 86 is arranged to engage shaft offset 89, but a large amount of clearance of rotation is allowed between the two, so that there is exhibited a large amount of backlash between the two. The magnitude of backlash may be on the order of a few degrees to 359 degrees. Preferably backlash is of the order of 50 to 320 degrees. Bearings not shown for shaft 78, 82 are rigidly attached to the supporting framework and are so equipped as to restrict axial motion of the shaft so that rotor 70 will at all times be able to engage spring 58, 61 when rotated.

Bearing 28, bearing 46, stop 73, and spring-holding terminal 16 are rigidly attached to the support structure. The angular position which rotor 70 has attained at the moment illustrated in mechanism 1 of FIGURE 1 was attained in clockwise rotation. At the moment of the illustration, the end of rotor 70 is in the process of pushing aside spring end 61 in the course of its rotation. If shaft 78 is driven additional revolutions in the clockwise direction the tip of rotor will push aside spring tip 61 once during each revolution. As the tip of rotor 70 rotates in the clockwise direction beyond spring tip 61, the spring tip 61 springs back against the side of slot 49, and will then be in position for a driving engagement whenever rotor tip of 70 reverses to approach it in counterclockwise rotation. In the position illustrated in mechanism 1, spring tip 58 is in a position far enough from the center of rotor 70 so that the tip of rotor 70 clears it. This concludes the portion of the description in which the description for mechanism 1 can be transliterated into descriptions for mechanisms 2 and 3.

Energy path 93 is the only source of drive power for the switch-actuator assembly of FIGURE 1, and is so arranged that it can cause motor 92 to rotate shaft 78 either clockwise or counterclockwise, or to allow it to coast to a stop, in a manner similar to the operation of conventional servomechanism drives or the drives for follow-up systems. FIGURE 1 shows the switch actuator assembly during a moment of time when the motor 92 is driving rotor 70 in a clockwise direction; and, having taken up the backlash between crank-extension 86 and shaft offset 89, drive torque is driving rotor 71 in clockwise rotation. The tip of rotor 71 has just engaged spring tip 59, and has started to drive member 41 in counterclockwise rotation. Member 41 has moved away from stop 73, and has caused member 26 to start rotating clockwise. A continuation of the driving forces will cause tension spring 38 and the associated pins 35 and 65 to move beyond their dead center, and the spring will cause member 26 to snap quickly against its stop 74, and mechanism 2 will have assumed the position of equilibrium illustrated in mechanism 1. After 41 has assumed the position shown for 40, continued clockwise drive or rotor 71 will cause repeated flexing of spring tip 62; but the continued rotation in the same direction will cause no further change in the state of equilibrium of mechanism 2. As clockwise rotation continues, the backlash between crank extension 87 and shaft offset 90 will be reduced until contact is made between the two of them and shaft 81 is driven in a clockwise direction. As clockwise drive continues, the backlash provided in each of the mechanisms intermediate between shafts 81 and 85 will be taken up, and rotor 72 will start to rotate clockwise. If rotation stops or reverses before the tip of rotor 72 engages spring tip 60, no disturbance of the condition of equilibrium illustrated for mechanism 3 will be imposed. If, however, the tip of rotor 72 is driven into spring tip 60 and continues its course, member 42 will be driven counterclockwise away from its position of rest against stop 77 into the unstable condition illustrated for mechanism 2.

The whole of FIGURE 1 functions as a driven switch-actuator system in response to the driving power delivered at input path 93. The motor 92 is caused to stop and start in a variety of sequences dictated by the control signals present in the interruption and reversing of power applied to path 93. Only one of the mechanisms 1, 2, or 3 changes from one state of equilibrium to another at a time.

Particular attention is called to an important concept and a significant characteristic feature of my invention that, regardless of the direction of drive rotation, and regardless of the combination of mechanism states manifested at any time, the next change of state will be the lowest-numbered mechanism not already manifesting the state corresponding to the direction of drive. This control of the change of state whereby assuredly the lowest numbered unit not already manifesting the state corresponding to the nature of the correction signal 93 is the unit which is corrected can be conveniently designated as correcting the lowest correctably member of the series. Heretofore, some servomechanisms have tended to oscillate while searching for a suitable correction by reason of the lack of reliability of correcting the lowest correctable member of the series.

Forces due to the pull of gravity on load 141, belt 140, idler 139, and weigh frame 135 are transmitted through angle bracket 116 and flexure pivot 106 to cause a counter-clockwise rotary displacement of lever 100, 101 about its fulcrum 107, and a corresponding amount of upward displacement of core 160. The result of this movement of core 160 is to increase the voltage across winding 137 and decrease the voltage across 138; and these two changes are added together in inverse relationship by reason of the series opposing connection of windings 137 and 138, so that their sum reaches the input of amplifier 146 through resistor 193. During the weighing interval the contacts of switch 100 are open so that no signal can be applied to amplifier 146 through resistor 192, so that the total input signal at amplifier 191 is the algebraic sum of the signals applied through resistors 193 and 191. Increase of the signal through resistor 193 immediately produces a drive signal in path 93 to motor 92 and turns rotor 70 in a direction to produce a closure of contacts 16 and 19. At the moment such closure occurs current will start flowing in resistor 180 and will pass through resistor 179; and the increased current flow in resistor 179 causes a proportionate increase in voltage across the resistor. This voltage, applied through resistor 191 as an input to amplifier 146, tends to balance the input through 193; and if the change of load at 141 is exactly the amount provided for in the value assigned to resistor 180, the amplifier output signal 93 will diminish to stop the motor 92 and allow mechanism to come to rest with resistor 180 connected to maintain its current flow in resistor 179 by way of contacts 16 and 19, which would remain closed. An essential feature of my invention is the arrangement of the parts of mechanism 1 so that as the contacts 16 and 19 close, the mercury globule 13 moves to the right and comes to rest in the right-hand end of envelope 4. This position of envelope 4 positions the mercury globule 13 to a state of preparedness for transmission of a readout pulse. The readout pulse is produced by reason of the mode of operation initiated upon closure of switch 190, which connects ground to both of its contacts. One of these two ground signals reaches amplifier 146 through resistor 192, and is of high enough magnitude, by reason of relatively low value selected for resistor 192, that it overcomes the other two signals into amplifier and cause motor 92 to drive rotor 70 at full speed in the direction to open contacts 16 and 19. At the same time the other ground signal from switch 190 is distributed, through the upper blade of mode switch 143, to terminal 7 of mercury switch 4. As the mercury globule moves across from right to left it momentarily contacts both of electrodes 7 and 10 at once, and so provides a momentary transmission of a ground pulse over lead 173 to the remote accumulator.

The duration of the closure of switch 190 is sufficient to allow the backlash between mechanisms 1 and 169 to be taken up, and for all of the successive mechanisms to be restored in succession to a zero position, corresponding to the open condition of the switch contacts associated with resistors 180 to 185, inclusive. This readout mode of operation provides an inherent means of scanning leads 173 to 177 in succession so as to originate a pulse on each of them if its mechanism had previously been positioned in suitable preparation, and to omit a readout pulse during the scan for each of them not prepared to originate a readout pulse. The overall performance is such that weighing occurs while switch 190 is open by reason of automatic balancing of the weight at 140 by balancing values selected from among resistors 180 to 185, inclusive, supplemented by weights dropped upon lever arm 100, selected automatically from among the group represented by weights 167 and 168.

The weighing and readout modes of operation occur in alternation with each other by reason of the alternate closing and opening of switch 190; and the synchronism between rotor 187 and idler 139 causes this closure and opening cycle to repeat once for each unit length of belt 140 passing over idler 139. This arrangement of the elements of my invention cause the amounts accumulated in the remote accumulator to accurately represent the total amount of weight passing idler 139 after the momentary operation of reset switch 145.

The automatic integration performance just described is disabled by throwing the switch blades of switch 143 to the position opposite to that illustrated in FIGURE 2, so that the alternate modes of weighting and readout must be selected manually under control of readout switch 144. When automatic integration is disabled, and readout switch positioned, as illustrated, automatic balancing and weighing will take place as previously described; but no readout of the balancing elements will occur. At any time the operator requires a readout of the weight present at 141, he may initiate it by pressing push-button switch 144 for a length of time sufficient for the motor 92 to drive all of the switches corresponding to 16, 19, to their open positions. The operator may clear this reading in readiness for the next weighing by momentarily pressing switch 145. In the conduct of such individual weighings and readout of weigh data, the operator may cause belt 140 to be stopped and place the items to be weighed at load location 141 by other means; or he may cause the belt to be driven at any desired speed so that items to be weighed will be carried by the belt in succession to weighing positions 141.

The innovation of the use of an expansion rod 156 to determine the distance of the top end of spring 134 from flexure pivot 107 accompanies the innovation of heavy spring 134 from flexure pivot 107 accompanies the innovation of heavy springs as flexure pivots and fulcrums, because of the effect of changes in temperature upon the elastic properties of the spring materials. Material of which expansion rod 156 is fabricated is selected so that any change in ambient temperature will make a corresponding change in the distance of the upper end of spring 134 from fulcrum 107. The amount of such change compensates for the change in sensitivity caused by the effect of such ambient change in the spring constants of all of the pivots acting together. Changes in sensitivity due to other causes may be counteracted by manual adjustment at knob 147.

Poise 154 acts in the manner of the familiar screw-driven poise commonly used on scale beams. It is an advantage of my invention that this poise is part of the main scale lever assembly itself, and so does not require a separate balance beam.

Various mercury switch arrangements are possible without departure from the invention. Prior art descriptions include both the end closing type, in which the length and positioning of the electrodes permits the closing of the switch in a preselected sloping position, and the middle closing type, in which the length and positioning of the electrodes permits the switch to be open in the two alternative sloping positions, but to close momentarily to send a pulse during the shifting between such two alternative sloping positions. If the remote display device is dependent upon a series of pulse signals, then the middle closing type mercury switches will be employed, but otherwise the end closing type of mercury switch would be used. Substitution of the correct type of mercury switch to comply with the needs of the remote display device can be made without departing from the invention. In an effort to illustrate both types and the ease of substitution thereof, mechanism 3 of FIG. 1 shows an end-closing type of mercury switch and mechanism 131 and 171 of FIG. 2 show the middle closing type of mercury switch. The term "mercury switch" embraces all switches utilizing a pool of liquid conductor flowable from opposite ends of a tiltable container.

Various modifications of the invention are possible without departing from the several inventive concepts herein disclosed and set forth in the appended claims.

The invention claimed is:

1. In a measuring system in which the quantity to be measured is translated into a signal actuating a servomotor actuating a plurality of balancing components until a satisfactory combination of balancing units is selected the improvement which consists of the combination of: a series of rotors, each rotor being adapted to actuate its associated balancing component; and backlash drive connections between each of the sequentially actuated rotors in the series, whereby simultaneous actuation of the balancing components is prevented and least next actuation of the balancing components is assured.

2. In a measuring system in which a satisfactory combination of balancing components is automatically selected by the forward and reverse rotations of a servomotor actuated by a correction signal, the improvement which consists of the combination of: a series drive connection among a series of rotors whereby rotation of the servomotor in a particular direction initially rotates the first rotor in said direction, and then, after a selected amount of takeup of backlash, rotates the second rotor, and the successive rotors are sequentially rotated with intervening takeup of backlash until a stopping or reversing signal is transmitted to the servomotor; a bistable component associated with each rotor and maintained in a status indicative of the most recent direction of rotation of its rotor, each bistable component applying a balancing component while in an advanced status; and an array of balancing components arranged so that the first rotor actuates a small balancing component, and subsequent rotors actuate larger balancing components, whereby each reversal of direction of the servomotor affects the smaller balancing components prior to larger balancing components and whereby least next actuation of balancing components is assured.

References Cited by the Examiner
UNITED STATES PATENTS

| | | | |
|---|---|---|---|
| 553,477 | 1/1896 | Spicer | 74—559 |
| 1,827,103 | 10/1931 | Penn. | |
| 2,023,235 | 12/1935 | Le Count. | |
| 3,190,996 | 6/1965 | Bedford. | |

FRED C. MATTERN, JR., *Primary Examiner.*

MILTON KAUFMAN, *Examiner.*

C. F. GREEN, *Assistant Examiner.*